(12) United States Patent
Kloetzer

(10) Patent No.: US 10,443,418 B2
(45) Date of Patent: Oct. 15, 2019

(54) SEAL CARRIER FOR A TURBOMACHINE, IN PARTICULAR A GAS TURBINE

(71) Applicant: MTU Aero Engines AG, Munich (DE)

(72) Inventor: Alexander Kloetzer, Fuerstenfeldbruck (DE)

(73) Assignee: MTU Aero Engines AG, Munich (DE)

( * ) Notice: Subject to any disclaimer, the term of this patent is extended or adjusted under 35 U.S.C. 154(b) by 289 days.

(21) Appl. No.: 15/478,261

(22) Filed: Apr. 4, 2017

(65) Prior Publication Data

US 2017/0284212 A1  Oct. 5, 2017

(30) Foreign Application Priority Data

Apr. 5, 2016 (EP) ..................................... 16163782

(51) Int. Cl.
| | | |
|---|---|---|
| F01D 11/00 | (2006.01) | |
| F01D 5/02 | (2006.01) | |
| F01D 9/04 | (2006.01) | |
| B33Y 10/00 | (2015.01) | |
| B33Y 80/00 | (2015.01) | |

(Continued)

(52) U.S. Cl.
CPC .......... *F01D 11/001* (2013.01); *B29C 64/153* (2017.08); *B33Y 10/00* (2014.12); *B33Y 80/00* (2014.12); *F01D 5/02* (2013.01); *F01D 9/041* (2013.01); *F01D 11/125* (2013.01); *F01D 11/127* (2013.01); *F05D 2220/323* (2013.01); *F05D 2230/22* (2013.01); *F05D 2230/31* (2013.01); *F05D 2250/12* (2013.01); *F05D 2250/121* (2013.01)

(58) Field of Classification Search
CPC ...... F01D 11/001; F01D 11/08; F01D 11/127; F01D 11/02; F01D 5/02; F01D 5/225; F01D 9/041; B33Y 80/00; B33Y 10/00; B29Y 10/00; B29C 67/0077; F05D 2220/323; F05D 2230/31
See application file for complete search history.

(56) References Cited

U.S. PATENT DOCUMENTS

| | | |
|---|---|---|
| 4,295,785 A | 10/1981 | Lardellier et al. |
| 4,884,950 A * | 12/1989 | Brodell .................. F01D 5/081 416/174 |
| 2013/0266426 A1 | 10/2013 | Mahle et al. |

(Continued)

FOREIGN PATENT DOCUMENTS

| | | |
|---|---|---|
| EP | 2818644 | 12/2014 |
| WO | WO2013/162946 | 10/2013 |
| WO | WO2014/031196 | 2/2014 |

*Primary Examiner* — George C Jin
(74) *Attorney, Agent, or Firm* — Davidson, Davidson & Kappel, LLC

(57) ABSTRACT

A seal carrier for a turbomachine, in particular a gas turbine, including a carrier base and at least one seal member, the at least one seal member being connected to the carrier base, and the at least one seal member being formed by a plurality of cavities arranged adjacent one another, in particular in a regular fashion, in the circumferential direction and the axial direction, the cavities extending from the carrier base in the radial direction, is provided. At least one stiffening element on the carrier base, the stiffening element extending along the circumferential direction and at least partially covering the at least one seal member at one of its axial end regions is provided.

22 Claims, 4 Drawing Sheets

(51) Int. Cl.
*F01D 11/12* (2006.01)
*B29C 64/153* (2017.01)

(56) References Cited

U.S. PATENT DOCUMENTS

| | | | |
|---|---|---|---|
| 2014/0020403 A1 | 1/2014 | Tsukuda et al. | |
| 2015/0003970 A1 | 1/2015 | Feldmann et al. | |
| 2015/0017003 A1* | 1/2015 | Shaffer | F01D 5/225 |
| | | | 416/182 |
| 2015/0292347 A1 | 10/2015 | Chouhan et al. | |
| 2017/0284213 A1* | 10/2017 | Liebl | F01D 11/001 |

* cited by examiner

SEAL CARRIER FOR A TURBOMACHINE, IN PARTICULAR A GAS TURBINE

This claims the benefit of European Patent Application No. 16163782.2, filed Apr. 5, 2016 and hereby incorporated by reference herein.

The present invention relates to a seal carrier for a turbomachine, in particular an industrial gas turbine or an aircraft gas turbine, the seal carrier including a carrier base and at least one seal member, the at least one seal member being connected to the carrier base, and the at least one seal member being formed by a plurality of cavities arranged adjacent one another, in particular in a regular fashion, in the circumferential direction and the axial direction, the cavities extending from the carrier base in the radial direction.

Directional words such as "axial," "axially," "radial," "radially," and "circumferential" are taken with respect to the machine axis of the turbomachine or gas turbine, unless the context explicitly or implicitly indicates otherwise.

BACKGROUND

Such seal carriers carrying honeycomb seal members are known in the art. Typically, the honeycomb seal members are brazed onto the carrier base. The seal carrier exhibits low stiffness, particularly in the circumferential direction, which is hardly improved by the honeycomb seal member because the honeycomb cells themselves are not particularly stiff in the circumferential direction. Since it is desired for the seal carrier including the seal member to be as flat as possible in the radial direction, the whole component has low stiffness.

SUMMARY OF THE INVENTION

It is an object of the present invention to provide a seal carrier that reduces or even eliminates the above disadvantages.

To achieve this object, it is proposed to provide at least one stiffening element on the carrier base, the stiffening element extending along the circumferential direction and at least partially covering the at least one seal member at one of its axial end regions. The partial coverage of an axial end region results in a stiffening element that extends in the circumferential direction and in the radial direction. Thus, it projects radially from the carrier base, forming kind of a circumferential rib. The provision of such a rib-like stiffening element increases the stiffness of the seal carrier, particularly in the circumferential direction. An increased stiffness of the seal carrier makes it also possible, for example, to reduce a running clearance formed between the seal member and an opposite sealing projection of a rotor component because the enhanced stiffness makes it possible to maintain small tolerances. By being at least partially covered, the seal member is protected from damage during installation. This protection is particularly effective when the stiffening element is radially dimensioned to completely cover the seal member.

In a refinement, it is proposed that a stiffening element be provided on the carrier base at each of its two axial end portions such that the at least one seal member is axially accommodated between the two stiffening elements. Thus, the seal carrier has a stiffening element at each of its two axial ends, so that a seal member accommodated therebetween is even better protected against damage. Furthermore, by providing a second stiffening element, the stiffness of the seal carrier is further enhanced.

It is preferred for the cavities of the at least one seal member to be formed by interconnected webs, the webs being arranged in such a way that, in a plan view looking in the radial direction, the cavities are polygonal in shape, in particular diamond-shaped. By arranging the webs in a diamond pattern, enhanced stiffness is achieved in particular in the circumferential direction as compared to a honeycomb configuration. In particular, the regions of intersection of each two webs present in a diamond pattern have a particularly stabilizing effect.

In a refinement, it is proposed to dispose two seal members axially adjacent one another on the carrier base, each seal member being covered by a respective stiffening element at its axial end region facing away from the adjacent seal member. The provision of two seal members allows for enhanced sealing between rotating and stationary components of a turbomachine, in particular a gas turbine. By providing a stiffening element at each axial end of the carrier base and by at least partially covering the two seal members at their axially outer sides, increased stiffness is achieved for the seal carrier, and the risk of damage to the seal members is reduced.

It is preferred that an additional stiffening element be provided between the two seal members in such a way that each seal member is accommodated between the additional stiffening element and the respective stiffening element that covers the axial end portion. Thus, in accordance with such an embodiment, the seal carrier includes three stiffening elements, two of which are disposed at the axial ends and one is disposed axially substantially centrally, the seal members being accommodated between the central stiffening element and a respective axially outer stiffening element. This measure also increases the stiffness of the seal carrier. It is also conceivable to provide four or more stiffening elements. In that case, for example, the axially outer stiffening elements could completely cover the respective seal members, and axially intermediate stiffening elements could have a smaller radial extent, such as, for example, half the radial dimension of the seal members, so that these smaller stiffening elements are received in the seal members and not visible from a radially inner viewpoint.

Furthermore, it is preferred that the carrier base, the at least one seal member and the at least one stiffening element be formed in one piece.

To this end, the carrier base, the at least one seal member and the at least one stiffening element may be manufactured by an additive manufacturing process, in particular by selective laser melting. In this connection, it is preferred that the carrier base, the at least one seal member and the at least one stiffening element be built up layer by layer, the layers lying adjacent one another in the axial direction.

In a refinement, it is proposed that the cavities of the seal member that are axially uppermost during layer-by-layer fabrication be at least partially filled such that the stiffening element adjoining and covering the seal member in the axial direction is connected to the at least partially filled cavities. The at least partial filling of the uppermost cavities serves to produce the connection to the terminal stiffening element. Moreover, the partial filling of the cavities is due to the layer-by-layer buildup.

The seal carrier may be in the form of a closed ring or an annular sector. If the seal carrier is configured as an annular sector, a ring shape may be formed by a plurality of seal carriers assembled together, the annular-sector-shaped seal carriers being arranged circumferentially adjacent one another and preferably connected to each other.

Moreover, the carrier base have a retaining structure formed on the side facing away from the at least one seal member, the retaining structure being adapted to connect the seal carrier to another component of a turbomachine or gas turbine.

The present invention further relates to a gas turbine, in particular an aircraft gas turbine, having at least one seal carrier as described above, the at least one seal carrier being associated with a stator vane ring, and the at least one seal member radially inwardly facing a rotating rotor component, in particular a shaft or a disk of a rotor blade ring and sealing projections formed thereon.

Finally, the present invention also relates to an additive process, in particular a selective laser melting process, for manufacturing a seal carrier as described above, the process including the steps of:
building up layer by layer a first stiffening element;
building up layer by layer interconnected, in particular intersecting, webs to form the seal member including cavities;
building up layer by layer at least partially filled cavities;
building up layer by layer a second stiffening element adjoining the at least partially filled cavities;
the carrier base also being built up layer by layer in each step of the layer-by-layer buildup process, and the building up of layers occurring in the axial direction of a seal carrier, as considered with respect to its normal use.

Preferably, the last row of cavities of a respective seal member, as considered in the build-up direction of the additive manufacturing process, is at least partially, preferably completely, filled, so that in the last row of cavities that are not filled, as considered in the build-up direction of the additive manufacturing process, the cavities are quadrangular in shape, but no unfilled cavities having a different, in particular triangular, shape are present in this row. This allows the inventive seal carrier to be additively manufactured in a simple manner as described without having to build up a solid layer on loose powder during the buildup process. In addition, the at least partially, preferably completely, filled cavities further enhance the stiffening effect of the adjacent stiffening element.

It is preferred in the process that the webs be built up layer by layer in such a manner that they intersect each other at an angle of about 90° and form an angle of about 45° with the layer build-up plane. The angle with the layer build-up plane may also be greater than 45° and may be up to 80°.

Finally, the process may also include the step of also building up a retaining structure connected to the carrier base in each step of the layer-by-layer buildup process.

BRIEF DESCRIPTION OF THE DRAWINGS

The present invention will now be described with reference to the accompanying figures by way of example and not by way of limitation.

DETAILED DESCRIPTION

Figure 1:
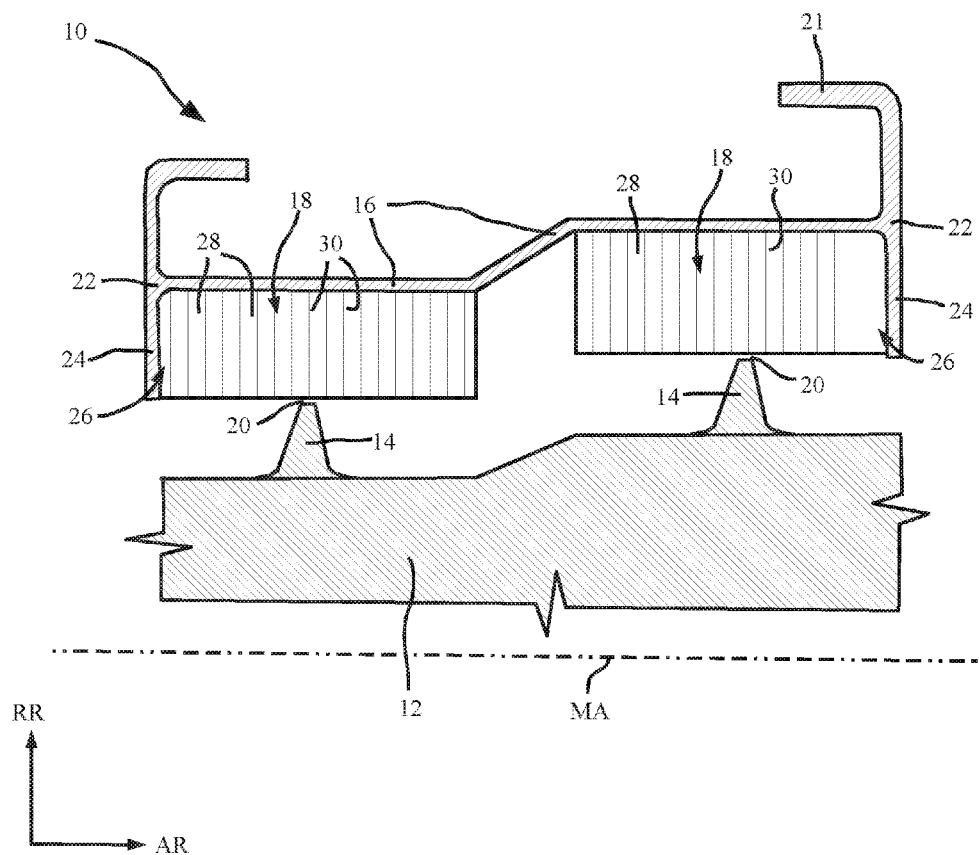
FIG. 1 is a simplified schematic cross-sectional view showing a seal carrier including a carrier base, two seal members disposed opposite two sealing projections (sealing fins) of a rotating component of a turbomachine, and two stiffening elements.

FIG. 1 shows a seal carrier 10 in simplified schematic cross-sectional view. A possible axis of rotation or machine axis MA of a turbomachine, in particular an industrial gas turbine or an aircraft gas turbine, is indicated by a dash-dot line. Machine axis MA extends in axial direction AR. A rotor component 12, which is shown only schematically here, is located opposite seal carrier 10 in radial direction RR. Rotor component 12 has sealing projections 14, which may also be referred to as sealing fins. Sealing projections 14 extend in radial direction RR toward seal carrier 10. Both the seal carrier 10 and rotor component 12 typically extend also in the circumferential direction about machine axis MA and may be segmented in the circumferential direction.

Seal carrier 10 has a carrier base 16. Preferably, carrier base 16 is a closed ring or an annular sector extending in the circumferential direction about machine axis MA. At least one seal member 18 is provided on carrier base 16. In the present exemplary embodiment, two seal members 18 are connected to carrier base 16. Each seal member 18 is located opposite a sealing projection 14 (sealing fin) in radial direction RR. A running clearance 20 is formed between sealing projection 14 and seal member 18. Running clearance 20 should be as small as possible to achieve the greatest possible sealing effect. During operation of a turbomachine, the forces acting and thermal deformations lead to operating states in which the sealing projections may come into contact with seal members 18. In this connection, seal members 18 are intended as wearing parts. In particular, seal members 18 are made from a less resistant material than sealing projections 14, so that during contact, the material of seal member 18 is worn away to a greater extent, or even exclusively, as compared to the material of sealing projection 14. Furthermore, a retaining structure 21 (shown only schematically here) is provided on the carrier base and used to attach seal carrier 10 to an associated component.

Stiffening elements 24 are connected to carrier base 16 at its axial end portions 22. Stiffening elements 24 each extend in radial direction RR along a respective axial end region 26 of the respective seal member 18, so that seal member 18 is covered by stiffening element 24. In the present example, seal members 18 are shown completely covered by the two stiffening elements 24 in radial direction RR. However, it is also possible for stiffening elements 24 to cover respective seal members 18 only partially in the radial direction. The provision of at least one stiffening element 24 enhances the stiffness of carrier base 16, particularly in the circumferential direction. By using two stiffening elements 24, the stiffness is overall further enhanced, and seal members 18 are protected from damage, in particular during installation.

Seal member 18 has a plurality of cavities 28 arranged adjacent one another, preferably in a regular pattern, the plurality of cavities being formed by webs 30, as illustrated in greatly simplified form in FIG. 1. Webs 30 have a height direction which substantially corresponds to radial direction RR. The wall thickness of webs 30 may be constant in the radial direction. Alternatively, the webs may also taper in shape toward the free ends facing sealing projections 14, and thus have a non-constant thickness.

Figure 2:
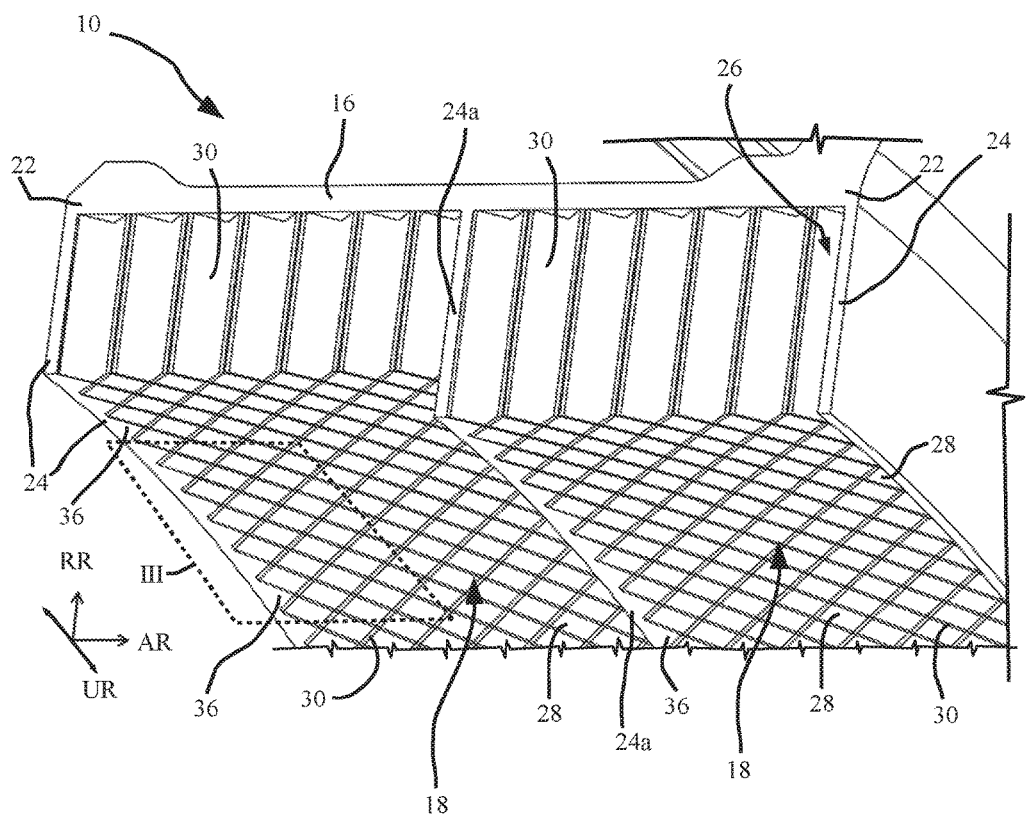
FIG. 2 is a simplified schematic perspective view of a seal carrier with two seal members and three stiffening elements, looking at a radially inner side of the seal members.

FIG. 2 shows a slightly modified embodiment of a seal carrier 10 with two seal members 18. Instead of a central region where no seal member is provided, as in the case of the inclined portion of carrier base 16 shown in FIG. 1, the two seal members 18 are provided adjacent each other on seal carrier 16. A further, third stiffening element 24a is provided between the two seal members 18. Thus, the two seal members 18 are each accommodated between a respective stiffening element 24 provided at an axial end portion 22 of carrier base 16 and third stiffening element 24a, which is preferably disposed approximately centrally in axial direction AR. In order to obtain a difference in level between seal members 18, so that a sealing surface of one seal member 18 located opposite a sealing projection 14 (FIG. 1) is radially further inward than the sealing surface of the other seal member 18, the seal members 18 of the embodiment shown in FIG. 2 have different heights in radial direction RR. In the embodiment shown in FIG. 1, this is achieved by the inclined central portion of carrier base 16, while seal members 18 have approximately the same height.

Figure 3:
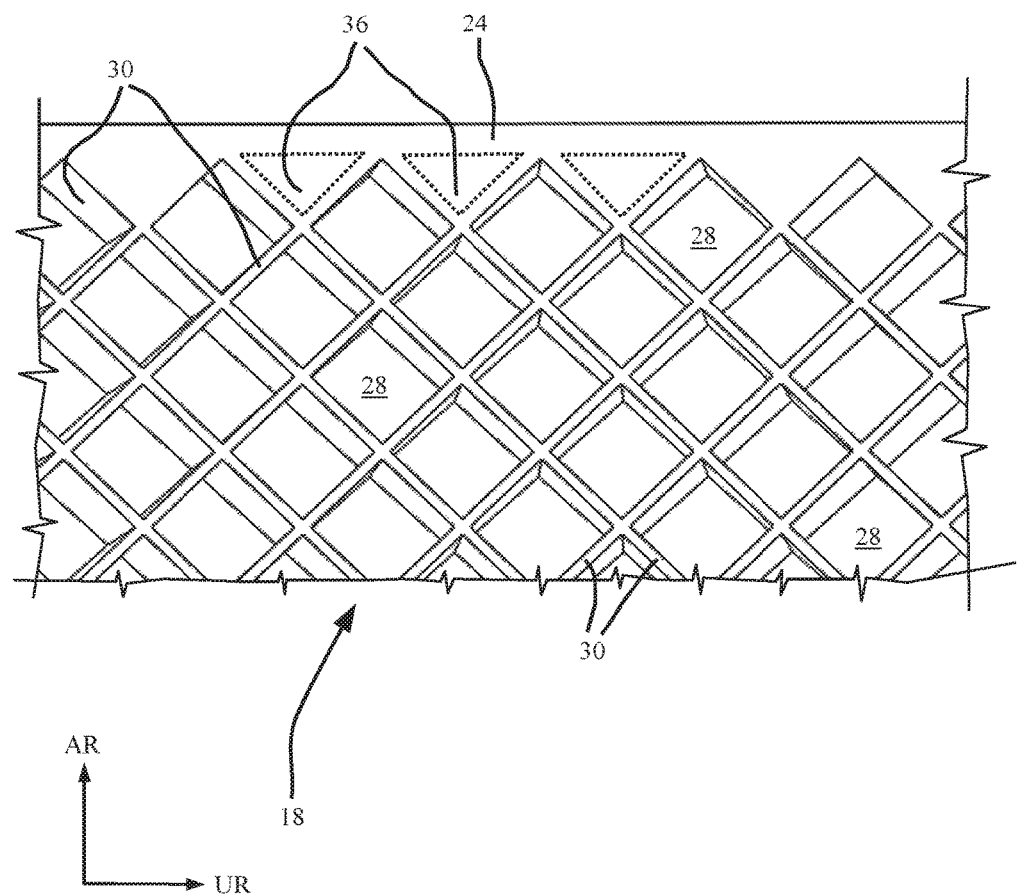
FIG. 3 is a simplified schematic perspective showing a portion of the axial end portion of the seal member with cavities bounded by webs, the portion shown approximately corresponding to the region III represented by the dashed line in FIG. 2.

As can be seen from FIGS. 2 and 3, seal member 18 (i.e., both seal members) has a plurality of cavities 28 arranged adjacent one another. Cavities 28 are bounded by webs 30, which may also be referred to as boundary walls. Preferably, webs 30 intersect each other, so that a diamond-like pattern is formed and each cavity 28 has the form of a diamond-shaped cylinder whose cylinder axis extends substantially in radial direction RR. Preferably, webs 30 intersect each other at an angle of 90°, so that the cavities correspond to a cylinder having a square base. Webs 30 are inclined; preferably at 45°, relative to axial direction AR. Thus, in a radially inner plan view (FIG. 3), there is obtained a mesh-like, in particular regular, arrangement of the webs 30 and cavities 28 of which seal member 18 is composed.

Figure 4:
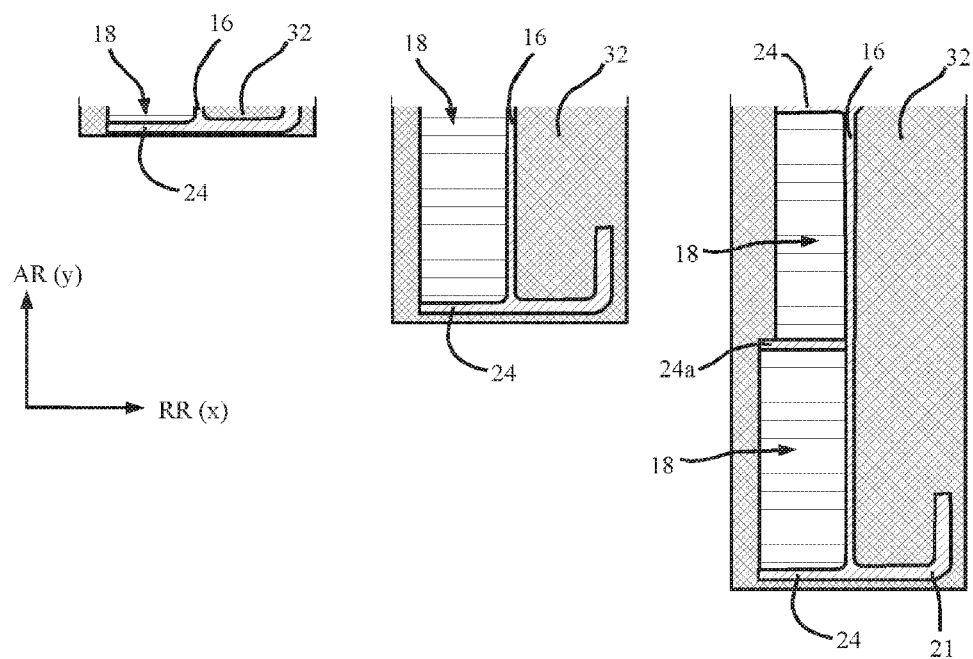
FIG. 4 is a simplified schematic view illustrating the manufacture of a seal carrier using an additive process, such as, for example, selective laser melting.

Preferably, seal carrier 10 is formed in one piece (i.e., integrally) with carrier base 16, seal member(s) 18 and stiffening elements 24, 24a. In particular, seal carrier 10 is manufactured using an additive process, such as selective laser melting (SLM). The manufacture of a seal carrier 10 by selective laser melting is shown in simplified schematic form in FIG. 4. The seal carrier is built up layer by layer in axial direction AR, as considered with respect its intended use and/or its intended installation in a turbomachine or gas turbine. In FIG. 4, axial direction AR is also referred to as y-direction. Seal carrier 10 is built up by melting metallic or/and ceramic powder 32 layer by layer. In this process, the seal carrier 10 being fabricated and unmelted powder are lowered further and further in the y-direction (axial direction AR) in a process chamber 34 (only schematically indicated in FIG. 4) until seal carrier 10 is completed. The completed seal carrier fabricated by selective laser melting and having seal members 18 and stiffening elements 24, 24a integrally formed thereon is then removed from process chamber 34 and cleaned of residual powder.

The webs 30 bounding cavities 28 of seal member 18 are inclined, preferably 45°, relative to the layer plane, which lies parallel to radial direction RR (i.e., the x-direction) and orthogonal to the axial direction (i.e., the y-direction). 45° is a preferred magnitude for the angle, which makes it possible to fabricate intersecting webs 3 by selective laser melting. The angle between the layer plane and a web could also be greater than 45°. For example, it could be 80°, so that the webs would intersect each other at a greater angle (up to about 160° instead of 90°. The cavities would then not have a square base, but a diamond or rhombus with angles unequal to 90°. The inclined configuration of webs 30 is preferred because in selective laser melting, it is difficult to produce junctions extending parallel to the layer plane, which would connect, for example, two webs configured orthogonally to the layer plane.

Figure 5:
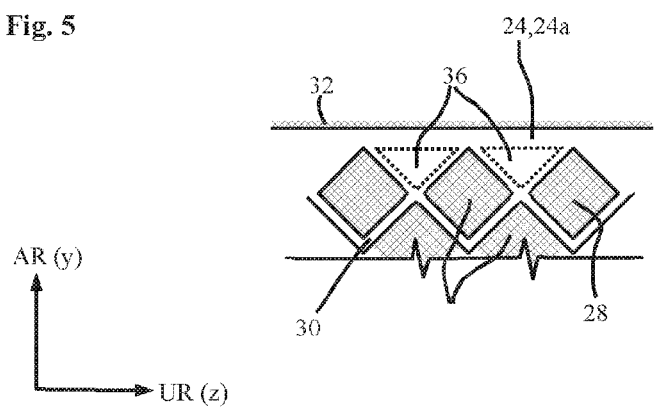
FIG. 5 is a simplified schematic view of the portion of the seal carrier that is located uppermost during an additive manufacturing process, showing in particular half-cavities which are filled and connected to a stiffening element.

FIG. 5, in simplified schematic foam, the portion of seal carrier 10 (and seal member 18, respectively) that is located uppermost in the axial direction (i.e., the y-direction) during fabrication.

Shown are the uppermost webs 30 as well as half-cavities 36 (surrounded by dashed lines, here triangular by way of example), which are at least partially filled with melted material and connected to the adjoining (uppermost) stiffening element 24. These half-cavities 36 must be filled up with melted material (shown as white areas) in order that stiffening element 24, which lies parallel to the layer plane, can be connected to the remainder of the seal carrier. What has been said for the stiffening element 24 located uppermost in the y-direction (i.e., axial direction AR) applies analogously also to the central stiffening element 24a, where (partially) filled half-cavities 36 are present as well. The half-cavities 36 filled with melted material are also visible in FIG. 2 at the central stiffening element 24a and the stiffening element 24 on the left in FIG. 2.

The manufacturing process illustrated in FIGS. 4 and 5 may be described as follows: Initially, a first lower stiffening element 24 is built up layer by layer. Interconnected, in particular intersecting, webs 30, are built up layer by layer to form seal member 18 including cavities 28. Then, at least partially filled cavities 36 are built up layer by layer, for example, at stiffening element 24a and/or uppermost stiffening element 24. Finally, a second stiffening element 24, 24a is built up layer by layer, the second stiffening element adjoining the at least partially filled cavities 36. In this process, carrier base 16 is also built up layer by layer in each step of the layer-by-layer buildup process, and the building up of layers occurs in axial direction AR (y-direction) of a seal carrier 10, as considered with respect to its normal use.

In principle, individual ring segments of seal carrier 10, which together form a full circle, may be fabricated in this way. However, it is preferred that the entire full ring be integrally formed in one piece using the process described above. This saves assembly effort during installation and provides increased tightness because there are no separating gaps between individual ring segments.

The seal carrier 10 presented here has at least one seal member 18 with a cavity shape (diamond) that is optimized for the preferred manufacturing process (SLM). The provision of seal carrier 10 including integral stiffening elements 24, 24a is enabled in an optimal way by the selected manufacturing process. The shape of cavities 28 is optimized in terms of minimizing webs 30 in circumferential direction UR, making it possible to reduce the removal of material in the rub-in region of sealing projections 14 (sealing fins).

The manufacturing process presented here is more cost-effective than processes known heretofore, in which seal members are brazed onto the carrier base. Seal carrier 10 has a significantly higher stiffness in the circumferential direction. This makes it possible to reduce the clearance (running clearance 20) between seal member 18 and sealing projection 14 (sealing fin), thereby allowing for an increase in the efficiency of a turbomachine or gas turbine. Since less material is abraded at sealing projections 14 (sealing fins) of rotor component 12 during operation of the turbomachine or gas turbine, dimensional stability is improved for running clearance 20, thereby reducing the loss in efficiency over the life of seal carrier 10.

LIST OF REFERENCE NUMERALS 10 seal carrier
12 rotor component
14 sealing projection
16 carrier base
18 seal member
20 running clearance
22 axial end portion of the carrier base
24 stiffening element
24a stiffening element
26 axial end region of the seal member
28 cavity
30 web
32 powder
34 process chamber
36 filled cavity

What is claimed is:

1. A seal carrier for a turbomachine comprising:
    a carrier base; and
    at least one seal member, the at least one seal member being connected to the carrier base, and the at least one seal member being formed by a plurality of cavities arranged adjacent one another in a circumferential direction and an axial direction, the cavities extending from the carrier base in a radial direction;
    wherein at least one stiffening element is provided on the carrier base, the at least one stiffening element extending along the circumferential direction and at least partially covering the at least one seal member at one of axial end regions of the at least one seal member.

2. The seal carrier as recited in claim 1 wherein the plurality of cavities are arranged adjacent one another in a regular fashion.

3. The seal carrier as recited in claim 1 wherein the at least one stiffening element includes stiffening elements at each of the two axial end regions such that the at least one seal member is accommodated in the axial direction between the two stiffening elements.

4. The seal carrier as recited in claim 1 wherein the cavities of the at least one seal member are formed by interconnected webs, the webs being arranged in such a way that, in a plan view looking in the radial direction, the cavities are polygonal in shape.

5. The seal carrier s recited in claim 4 wherein the cavities are diamond-shaped.

6. The seal carrier as recited in claim 1 wherein the at least one seal member includes two seal members disposed on the carrier base adjacent one another in the axial direction, each seal member being covered by a respective stiffening element of the at least one stiffening element at the respective axial end region facing away from the respective adjacent seal member.

7. The seal carrier as recited in claim 6 further comprising an additional stiffening element provided between the two seal members in such a way that each seal member is accommodated between the additional stiffening element and the respective stiffening element covering the axial end region.

8. The seal carrier as recited in claim 1 wherein the carrier base, the at least one seal member and the at least one stiffening element are formed in one piece.

9. The seal carrier as recited in claim 1 wherein the carrier base, the at least one seal member and the at least one stiffening element are additively manufactured.

10. The seal carrier as recited in claim 9 wherein the carrier base, the at least one seal member and the at least one stiffening element are selective laser melted.

11. The seal carrier as recited in claim 9 wherein the carrier base, the at least one seal member and the at least one stiffening element are formed by layers built up layer by layer, the layers lying adjacent one another in the axial direction.

12. The seal carrier as recited in claim 9 wherein axially uppermost cavities of the seal member are at least partially filled such that the stiffening element adjoining and covering the seal member in the axial direction is connected to the at least partially filled cavities.

13. The seal carrier as recited in claim 1 wherein the seal carrier is in the form of a closed ring or an annular sector.

14. The seal carrier as recited in claim 1 wherein the carrier base has a retaining structure formed on the side facing away from the at least one seal member, the retaining structure being adapted to connect the seal carrier to another component of a turbomachine.

15. The seal carrier as recited in claim 14 wherein the turbomachine is a gas turbine.

16. A gas turbine comprising: at least one seal carrier as recited in claim 1, wherein the at least one seal carrier is associated with a stator vane ring, and wherein the at least one seal member radially inwardly faces a rotating rotor component.

17. The gas turbine as recited in claim 16 wherein the rotating rotor component is a shaft or a disk of a rotor blade ring and sealing projections formed thereon.

18. An aircraft gas turbine comprising the gas turbine as recited in claim 16.

19. An additive process for manufacturing the seal carrier as recited in claim 1, the process comprising the steps of:
    building up layer by layer a first stiffening element of the at least one stiffening elements;
    building up layer by layer interconnected webs to form the seal member including cavities; building up layer by layer at least partially filled cavities;
    building up layer by layer a second stiffening element of the at least one stiffening elements adjoining the at least partially filled cavities;
    the carrier base also being built up layer by layer in each step of the layer-by-layer buildup process, and the layer buildup occurring in the axial direction of the seal carrier, as considered with respect to a normal use.

20. The process as recited in claim 19 further comprising the step of building up the webs layer by layer in such a manner that they intersect each other at an angle of about 90° and form an angle of about 45° with the layer build-up plane.

21. The process as recited in claim 19 further comprising the step of also building up a retaining structure connected to the carrier base in each step of the layer-by-layer buildup process.

22. A selective laser melting process comprising the additive process as recited in claim 19.

* * * * *